(12) United States Patent
Lee et al.

(10) Patent No.: US 7,841,918 B2
(45) Date of Patent: Nov. 30, 2010

(54) METHOD FOR MANUFACTURING PLANE LIGHT SOURCE

(75) Inventors: Shu-Ping Lee, Taoyuan (TW); San-Yuan Chen, Taoyuan (TW); Kuan-Ting Kuo, Taoyuan (TW); Chu-Chi Ting, Taoyuan (TW); Yu-Heng Hsieh, Taoyuan (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 678 days.

(21) Appl. No.: 11/639,681

(22) Filed: Dec. 15, 2006

(65) Prior Publication Data
US 2008/0146112 A1   Jun. 19, 2008

(51) Int. Cl.
*H01J 9/24* (2006.01)
*H01J 17/49* (2006.01)

(52) U.S. Cl. .............. 445/24; 313/586; 313/587
(58) Field of Classification Search .......... 313/582–587
See application file for complete search history.

(56) References Cited

U.S. PATENT DOCUMENTS

| | | | | |
|---|---|---|---|---|
| 6,495,958 B1 * | 12/2002 | Moon | ............... | 313/584 |
| 6,627,114 B2 | 9/2003 | Suzuki | ............... | 252/301.4 R |
| 6,905,636 B2 | 6/2005 | Yuan et al. | ............... | 252/301.4 R |
| 2004/0239245 A1 * | 12/2004 | Kawamura et al. | .......... | 313/582 |
| 2005/0225520 A1 * | 10/2005 | Sugimoto et al. | ............. | 345/87 |
| 2005/0248275 A1 * | 11/2005 | Kobayashi | ................. | 313/586 |
| 2005/0264201 A1 * | 12/2005 | Kang | ....................... | 313/582 |

FOREIGN PATENT DOCUMENTS

JP       2005351752     * 12/2005

OTHER PUBLICATIONS

Machine translation of JP2005351752, Takehiko, Dec. 22, 2005.*

* cited by examiner

*Primary Examiner*—Bumsuk Won
(74) *Attorney, Agent, or Firm*—Jianq Chyun IP Office (57) ABSTRACT

Microwave irradiation treatment is used to enhance the luminescent efficiency by improving surface morphology of the illuminating phosphors. The invention modifies the phosphor particles from the sheet-like shape into the spherical shape and so as to exhibit better crystalline property, thus it may provide for the fabrication of the phosphors with high luminescent efficiency for the optoelectronic devices.

13 Claims, 11 Drawing Sheets
(6 of 11 Drawing Sheet(s) Filed in Color)

METHOD FOR MANUFACTURING PLANE LIGHT SOURCE

BACKGROUND OF THE INVENTION

1. Field of the Invention

The present invention relates to a method for manufacturing a plane light source, and more especially, to a method to enhance the luminous efficiency of the plane light source.

2. Background of the Related Art

Flat panel display (FPD) has received a great deal of attention. Very recently, the development of large area panel such as high definition television and high information content presentation becomes a major trend of the technical development in the FPD community. Enormous competition has being placed in the FPD industry where the traditional cathode-ray tube (CRT) has been largely challenged and replaced gradually by more brighter, thinner and purer luminous alternatives such as the thin film transistor-liquid crystal display (TFT-LCD), the field emission display (FED) and the plasma display panel (PDP), etc. Among those display models, it is the most critical to develop an efficient illuminating technology, i.e., the plane light source. Illuminating phosphors are of the concern since they provide an illuminating source with improved brightness, cost-effectiveness, stability, and uniformity compared to the currently-used cold cathode fluorescence lamp (CCFL). However, the phosphor presents a poorer efficiency of illumination than the latter. This will become a critical issue if a large-area display panel is to be targeted.

Efficiency, together with brightness and luminous purity, of the white light illumination is affected by a number of factors including the nature of phosphor materials, particle size, particle morphology, and packing efficiency of the phosphor powder upon screen printing. In addition, the illuminating behavior of the phosphor is essentially surface-luminescent upon a given excitation of such as the vacuum ultraviolet (VUV) irradiation. Therefore, the surface characteristics and morphology of the phosphor particles will play an important role in the resulting illumination property.

Currently, the plane light source has three kinds of phosphors: $(Y,Gd)BO_3$:Eu (YGB, red color), $BaMgAl_{10}O_{17}$:Eu (BAM, blue color) and $Zn_2SiO_4$:Mn (ZSM, green color), wherein the blue color phosphor has the lowest luminance and the shortest lifetime comparing to the others, and it gets even worse after the panel manufacturing process is completed. U.S. Pat. No. 6,627,114 discloses a phosphor coated with Mg or P to optimize the luminescent materials for a plane light source, wherein the phosphors coated with Mg or P have smoother decay than those without coating. However, the initial brightness of the coated phosphors in initiating is less bright than those without coating.

SUMMARY OF THE INVENTION

In order to solve the problems mentioned above, the present invention provides a method for manufacturing a plane light source. The method effectively modifies the surface morphology and crystalline characteristics of the phosphors than those without treatment.

Another object of the present invention is to provide a method for manufacturing a plane light source. With the microwave irradiation treatment, an efficient way is developed to apply for the mass production of the phosphors with high luminescent efficiency.

Another object of the present invention is to provide a method for manufacturing a plane light source. By coating MgO around the surfaces of the phosphor particles and using microwave irradiation to heat the phosphor particles, the phosphor particles in the powder may have high luminescent efficiency for the optoelectronic devices.

To achieve these and other advantages and in accordance with the purpose of the present invention, as embodied and broadly described, a method for manufacturing a plane light source including: providing a first transparent substrate; forming a plurality of electrode pairs on the first transparent substrate; forming a dielectric layer on the first transparent substrate and covering the electrode pairs; coating a plurality of phosphors on the first transparent substrate and heating the phosphors by microwave irradiation; providing a second transparent substrate; assembling the second transparent substrate with the first transparent substrate; and fulfilling a plurality of inert gas within the second transparent substrate and the first transparent substrate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order to more fully describe embodiments of the present invention, reference is made to the accompanying drawings. These drawings are not to be considered limitations in the scope of the invention, but are merely illustrative.

DETAILED DESCRIPTION OF THE INVENTION

Figure 1:
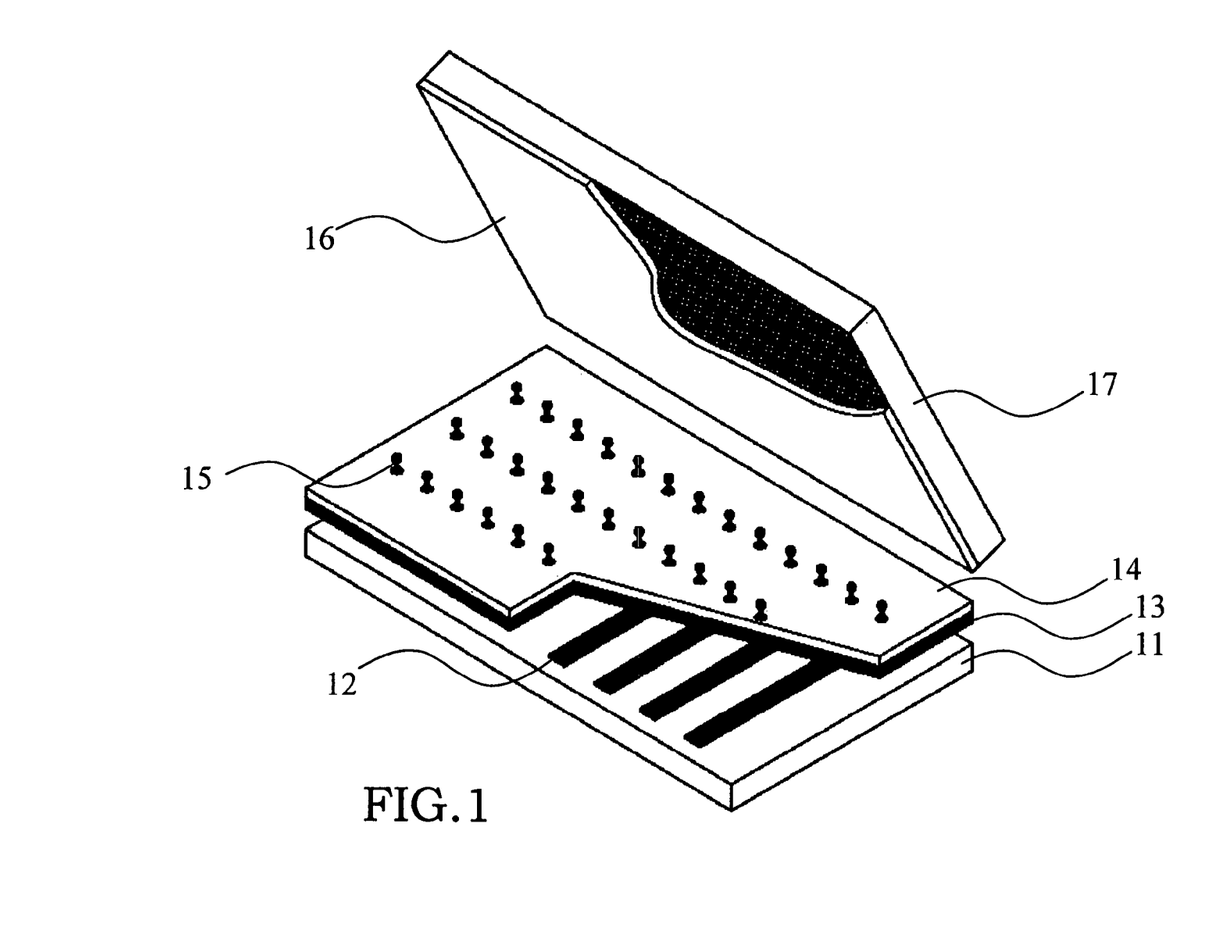
FIG. 1 shows a structure diagram of a plane light source according to one embodiment of the present invention.

FIG. 1 shows a structure diagram of a plane light source according to one embodiment of the present invention. A plane light source includes a lower transparent substrate 11, a plurality of electrode pairs 12 on the upper surface of the lower transparent substrate 11, the lower dielectric layer 13 covering the electrode pairs 12, a phosphor layer 14 arranged on an upper surface of the lower dielectric layer 13, some spacers 15 formed on the phosphor layer 14, an upper transparent substrate 17 arranged in parallel to the lower transparent substrate 11, and a phosphor layer 16 covering the inner plane of upper transparent substrate 17 and opposite to the phosphor layer 14.

Figure 2:
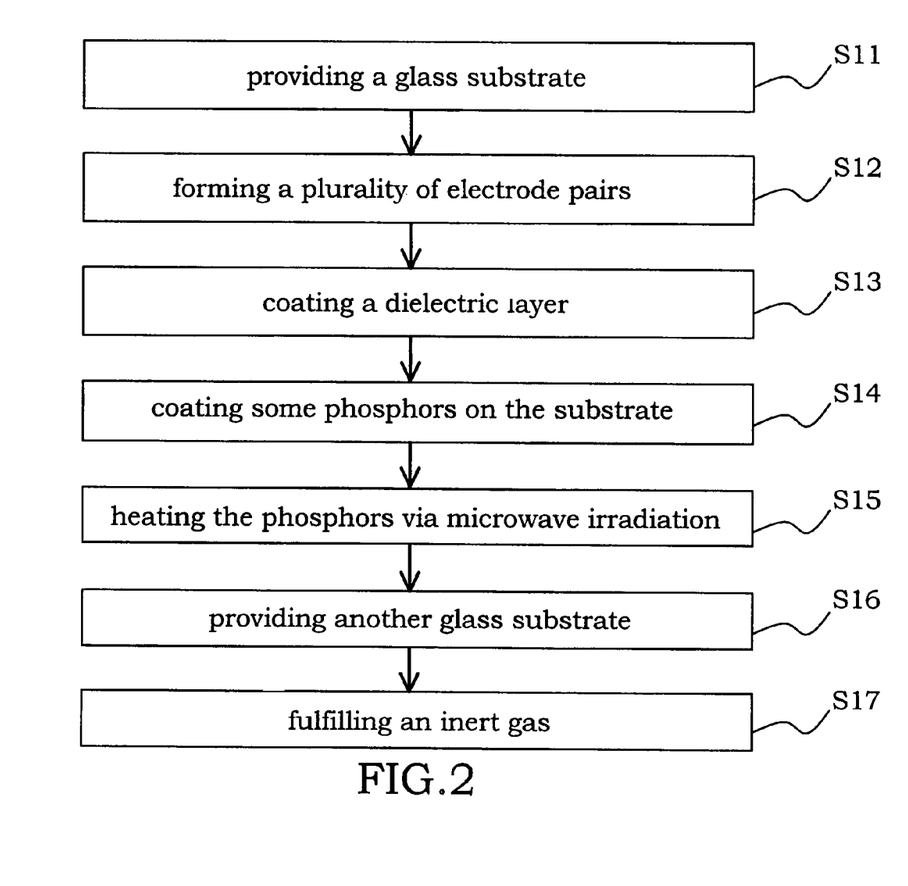
FIG. 2 shows a method for manufacturing a plane light source according to one embodiment of the present invention.

FIG. 2 shows a method for manufacturing a plane light source according to one embodiment of the present invention. The step S11 provides a glass substrate for the rear transparent substrate of a plane light source. The step S12 forms a plurality of electrode pairs on the rear transparent substrate. In step S13, a dielectric layer is coated on rear transparent substrate. In step S14, some phosphors (or powder) are coated on the rear transparent substrate using the spraying, screen-printing or dry film method. In step S15, the phosphors are heated by microwave irradiation. In step S16, a glass substrate is provided for the front transparent substrate and assembled with the rear transparent substrate. In step S17, an inert gas is fulfilled within the front transparent substrate and the rear transparent substrate. In addition, some spacers are resided between the front transparent substrate and the rear transparent substrate.

In another embodiment, the front transparent substrate has a phosphor layer coated on the inner plane of the rear transparent substrate, wherein the phosphor layer is heated by microwave irradiation.

Figure 3A:
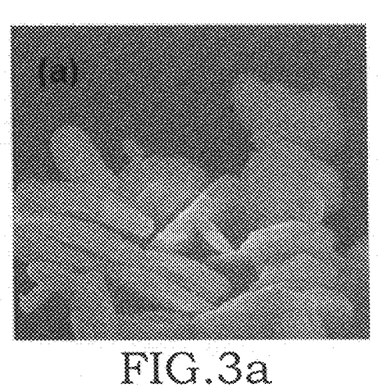
FIG. 3a-FIG. 3d show the scanning electron microscopy images of white-light phosphor treated with various microwave irradiation conditions.
Figure 3B:
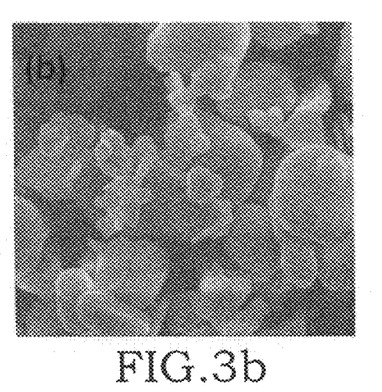
Figure 3C:
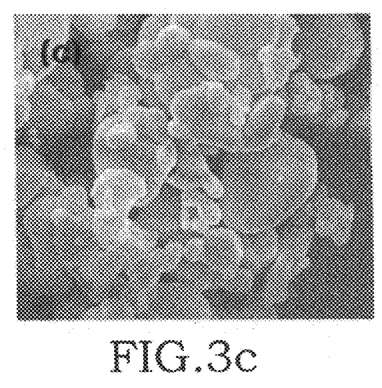
Figure 3D:
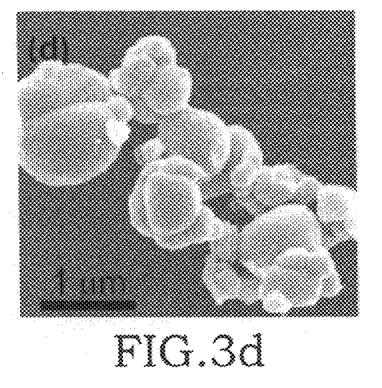

FIG. 3*a*-FIG. 3*d* show the scanning electron microscopy images of white-light phosphor treated with various microwave irradiation conditions. Without microwave irradiation treatment, the white-light phosphor presents a sheet-like shape with a homogeneous diameter of approximate 2-5 μm as shown in FIG. 3*a*. However, when the phosphors were treated by microwave irradiation, it was found that the surface morphology of the white-light phosphor becomes nearly spherical but their size was almost unchanged in the range of 2-5 μm, as shown in FIG. 3*b*-FIG. 3*d*, FIG. 3*b* using 100 W in 180 second, FIG. 3*c* using 300 W in 180 second, and FIG. 3*d* using 600 W in 180 second. This reveals that the particle morphology has been modified under microwave treatment.

Figure 4:
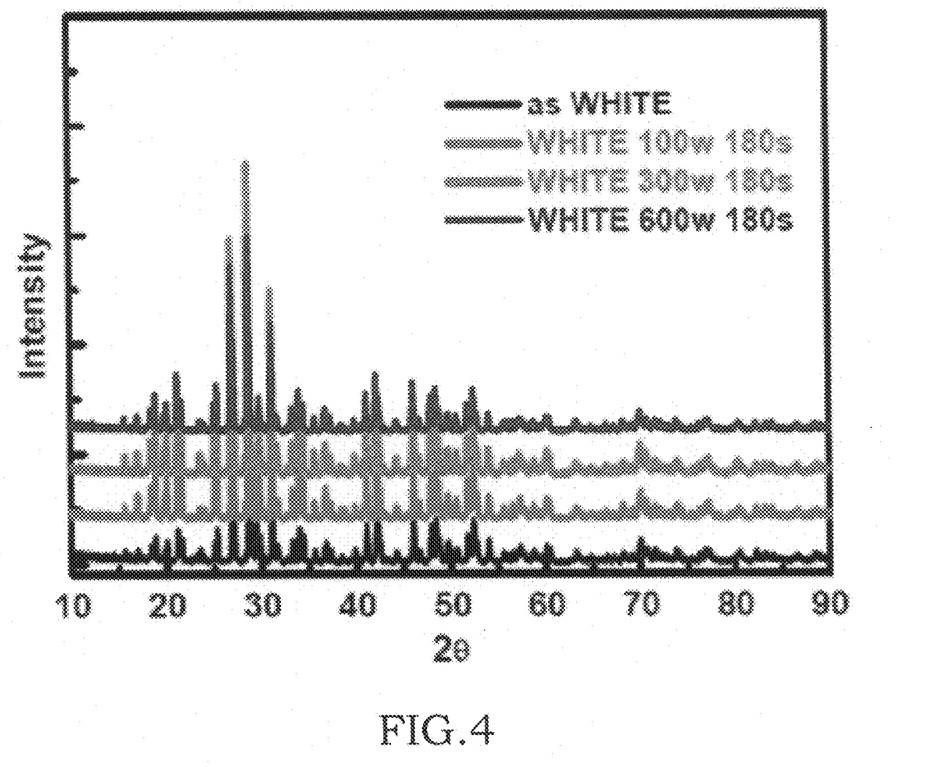
FIG. 4 illustrates the crystalline phase remains unchanged with microwave irradiation treatment.

The X-ray diffraction pattern of the phosphors in FIG. 4 illustrates that with microwave irradiation treatment, the crystalline phase remains unchanged, which all of them are corresponding to the reference of the white-light phosphor. Furthermore, it was found that the peak intensity of the corresponding diffraction lines to the white-light phosphors increases with the power of microwave irradiation up to 300 W, but above that, it becomes decreased. This result demonstrates that there exists an optimal microwave condition to upgrade the crystalline properties of those phosphor powder and maximize the luminous efficiency.

Figure 5A:
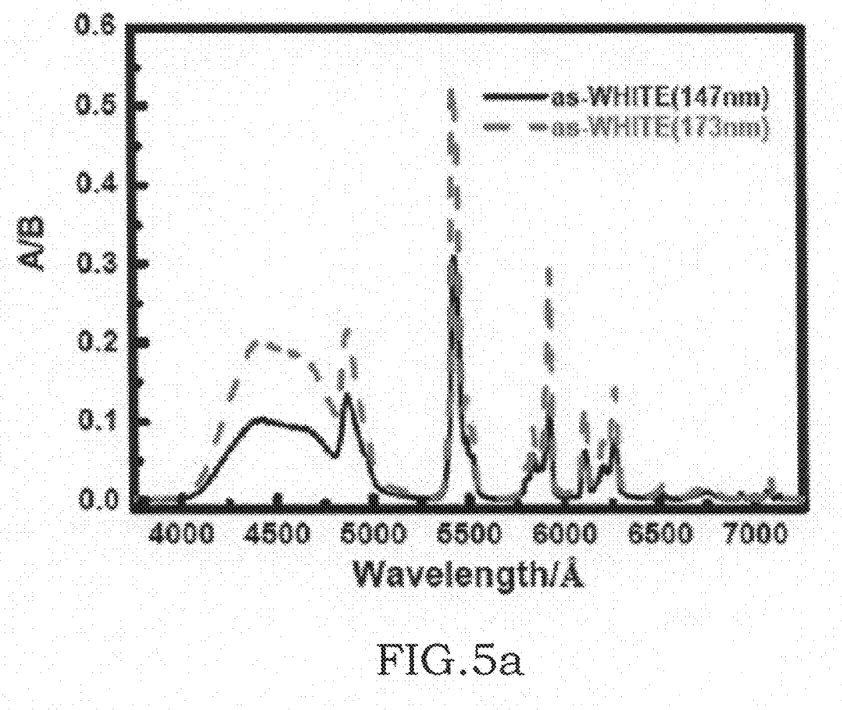
FIG. 5a and FIG. 5b illustrate the photoluminescence (PL) properties of white-light phosphors with or without microwave irradiation treatment under VUV excitation (147 and 173 nm) at room temperature.
Figure 5B:
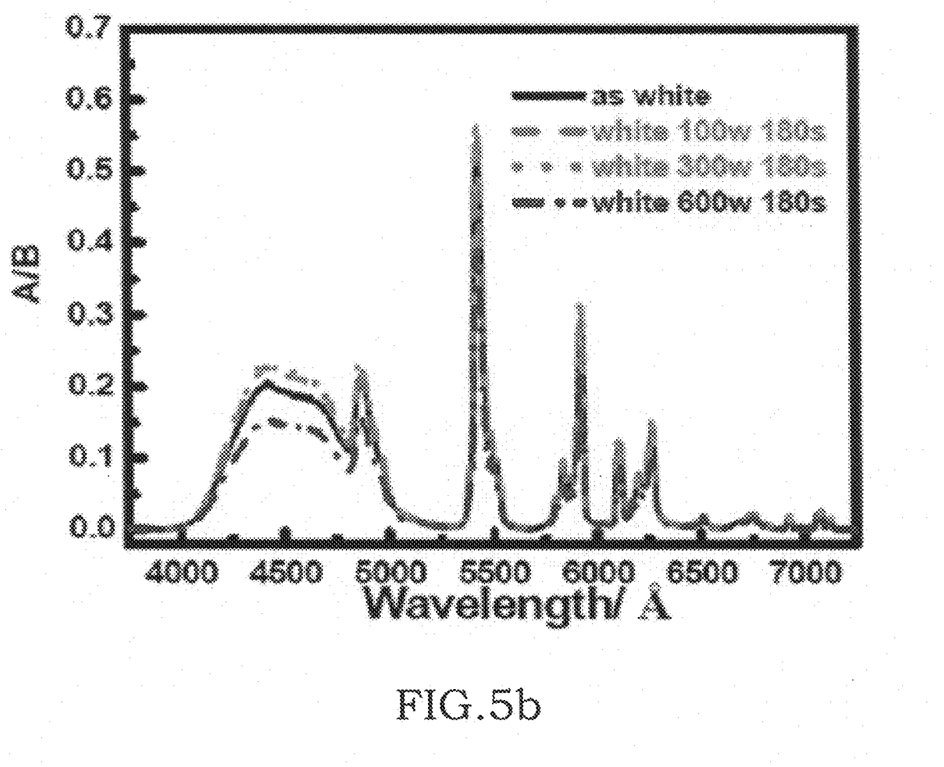

FIG. 5*a* and FIG. 5*b* illustrate the photoluminescence (PL) properties of white-light phosphors with or without microwave irradiation treatment under VUV excitation (147 and 173 nm) at room temperature. The PL spectra in FIG. 5*a* indicates that the same prepared white-light phosphors exhibit a higher luminescent efficiency at 173 nm excitation compared to 147 nm in the range of 400 to 700 nm. Moreover, it was observed that those reference white-light phosphors exhibit a higher luminescent efficiency at 173 nm excitation compared to 147 nm. On the other hand, FIG. 5*b* clearly demonstrates that the luminescent efficiency can be improved by microwave irradiation treatment. The peak intensities of all visible emissions increase with input power up to 300 W but then they decrease, and this suggests that a higher power microwave irradiation (600 W) would supply the excess energy to merge the small white-light phosphor powders into a large one. In this condition, many defects could be formed and therefore, the luminescent efficiency of white-light phosphors would be reduced. However, the present results reveals that microwave treatment may effectively improve the luminescent efficiency.

In FIG. 2, for another embodiment, the step S15 of microwave irradiation heating may process in advance of the step S14 for enhancing the luminescent efficiency.

Figure 6:
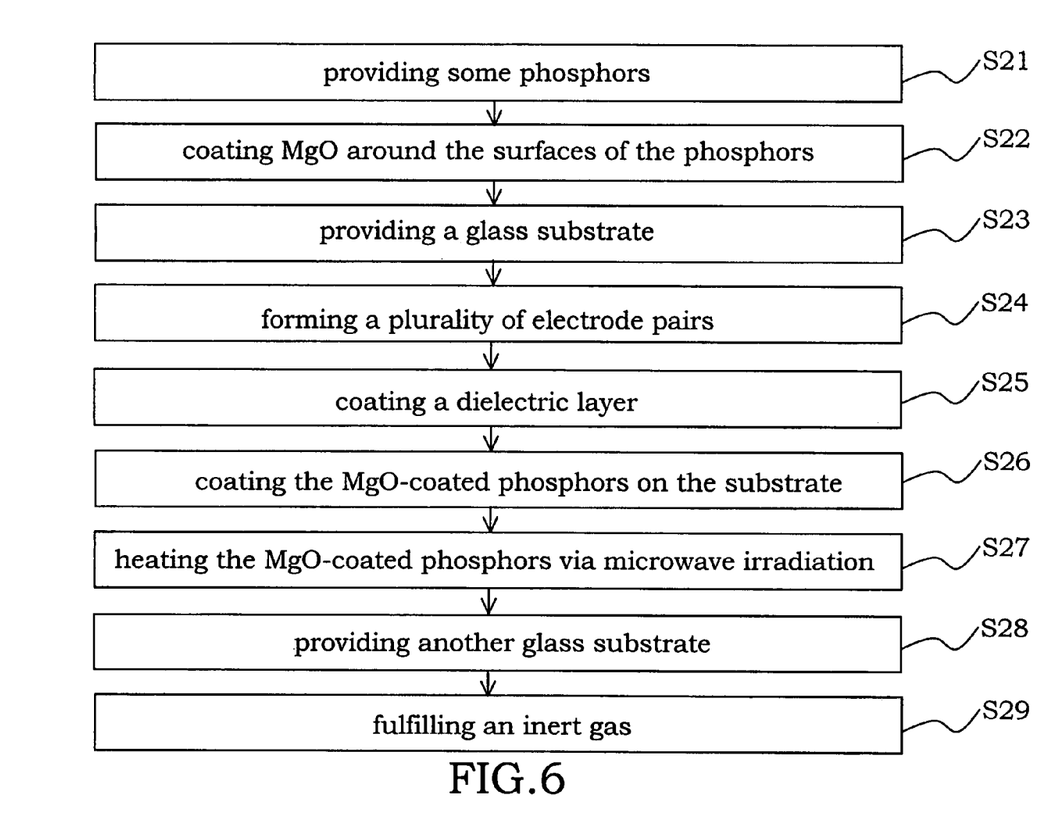
FIG. 6 shows a method for manufacturing a plane light source according to one embodiment of the present invention.

Referring to FIG. 2 again, the method for manufacturing a plane light source may further include coating MgO around the surfaces of the phosphors to enhance luminous efficiency before the step S14, coating a plurality of phosphors on the rear transparent substrate. FIG. 6 shows a method for manufacturing a plane light source according to another embodiment of the present invention. The step S21 provides some phosphor particles (or molecules). The step S22 coats MgO around the surfaces of the phosphor particles. The step S23 provides a glass substrate for the rear transparent substrate of a plane light source. The step S24 forms a plurality of electrode pairs on the rear transparent substrate. In step S25, a dielectric layer is coated on rear transparent substrate. In step S26, the MgO-coated phosphors are coated on the rear transparent substrate using the spraying, screen-printing or dry film method. The step S27 uses microwave irradiation to heat the MgO-coated phosphors. In step S28, a glass substrate is provided for the front transparent substrate and assembled with the rear transparent substrate. In step S29, an inert gas is fulfilled within the front transparent substrate and the rear transparent substrate.

The coating step S22 may further include the following processes: mixing a $Mg(CH_3COO)_2 \cdot 4H_2O$ source, a di-ethylene glycol source and a NaOH source to produce a first aqueous solution, and heating the first aqueous solution to 140° C. temperature for 1 hour in a microwave system; heating the first aqueous solution to 180° C. temperature for 2 hours; cooling the first aqueous solution to room temperature and mixing an ethanol source to produce a second aqueous solution; mixing a phosphor source and deionized water to produce a third aqueous solution; mixing the second aqueous solution with the third aqueous solution to produce a fourth aqueous solution; and filtering and heating the fourth aqueous solution to 350° C. for 30 minutes to produce a plurality of phosphor particles with MgO coating.

Figure 7A:
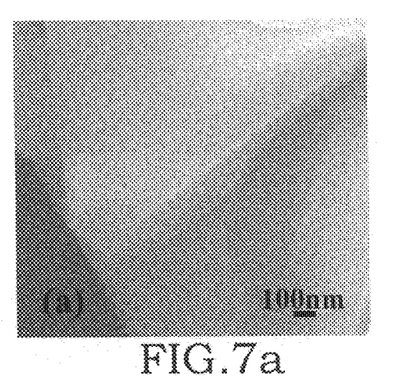
FIG. 7a-FIG. 7c show the scanning electron microscopy images of blue-light phosphor (BAM) according to one embodiment of the present invention.
Figure 7B:
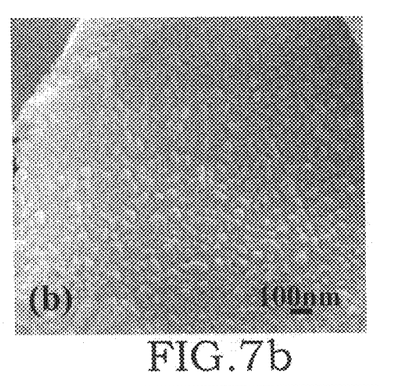
Figure 7C:
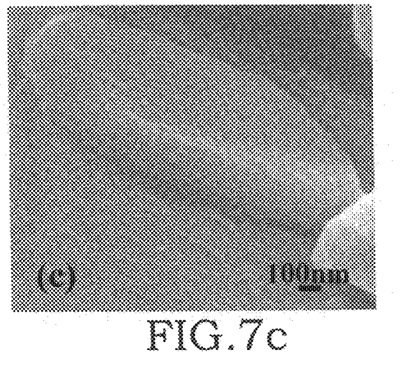
Figure 7D:
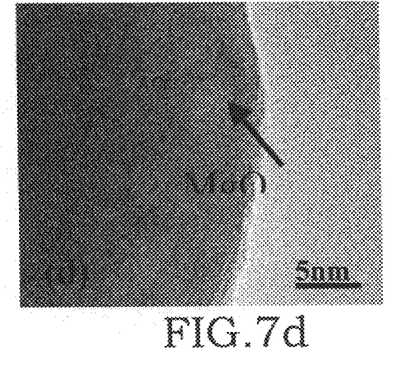
FIG. 7d shows the transmission electron microscopy image of blue-light phosphor (BAM) according to one embodiment of the present invention.

FIG. 7*a*-FIG. 7*c* show the scanning electron microscopy images of the blue-light phosphor (BAM) according to one embodiment of the present invention. FIG. 7*a* shows the image of BAM. FIG. 7*b* shows the image of BAM with 5.25% concentration of MgO. FIG. 7*c* shows the image of BAM with 17.5% concentration of MgO. FIG. 7*d* shows the transmission electron microscopy image of BAM with 17.5% concentration of MgO.

Figure 8A:
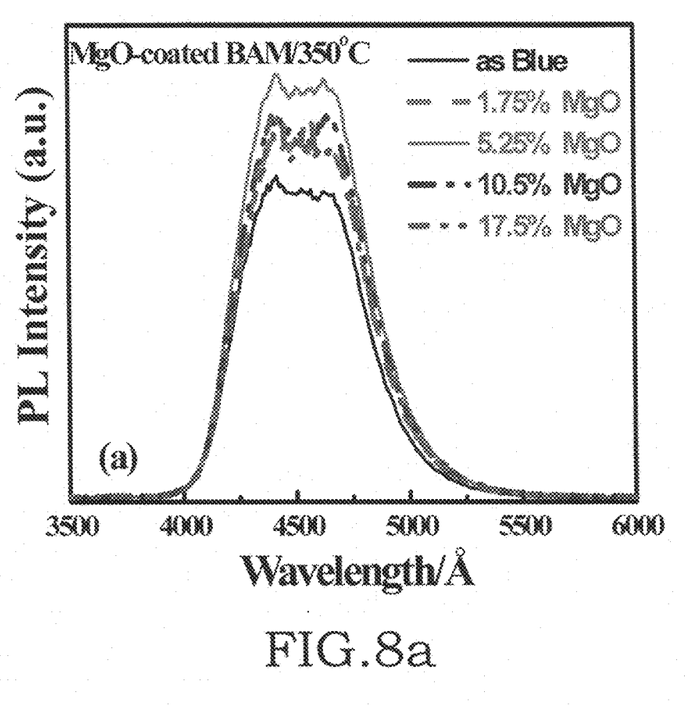
FIG. 8a and FIG. 8b illustrate the photoluminescence (PL) properties of BAM with or without the MgO coating.
Figure 8B:
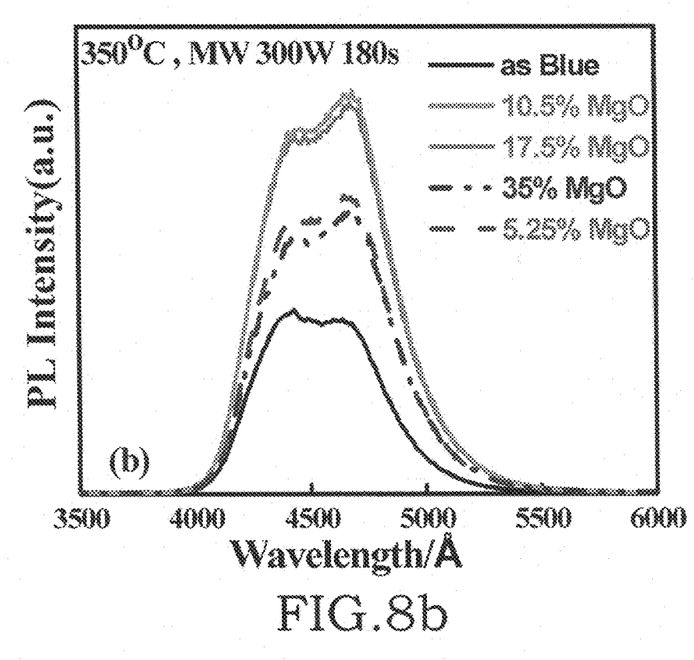

FIG. 8*a* illustrates the photoluminescence (PL) properties of BAM with or without the MgO coating. The PL spectra indicate that the MgO-coated BAM exhibits a higher luminescent efficiency than those without coating. FIG. 8*b* demonstrates that the luminescent efficiency can be improved by various microwave irradiation treatment (2.54 GHz, 100-600 W/30-420 s).

Figure 9:
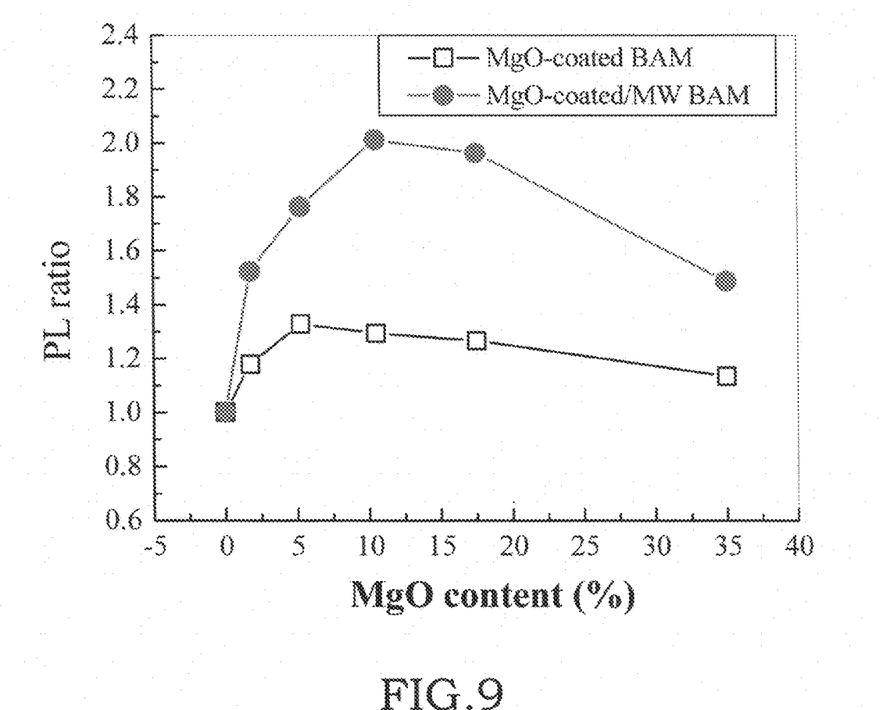
FIG. 9 illustrates the photoluminescence (PL) ratio of the MgO coating BAM with or without microwave (MW) process.

FIG. 9 illustrates the photoluminescence (PL) ratio of the MgO-coated BAM with or without microwave (MW) process, and the MgO-coated BAM with MW process has twice photoluminescence efficiency than others.

Figure 10:
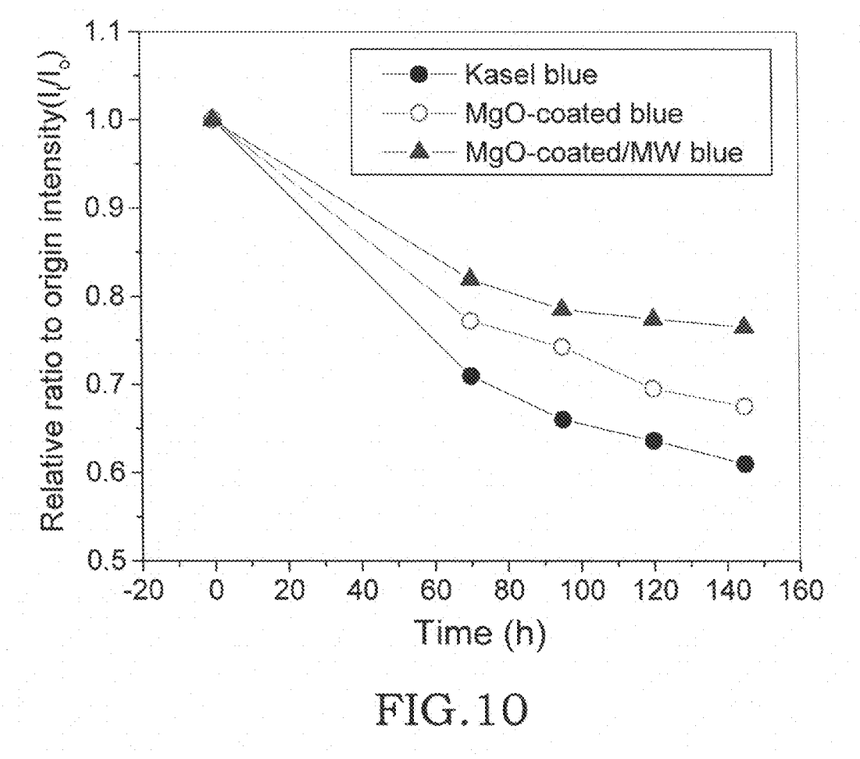
FIG. 10 illustrates the relative ratio to origin intensity of the MgO coating BAM with or without microwave (MW) process.

FIG. 10 illustrates the relative ratio to origin intensity of the MgO coated-BAM with or without microwave (MW) process. The MgO coated-BAM with MW process has lower decay slope than others.

Furthermore, the same experimental result may be obtained in other phosphors, which may produce other colors, such as red, green, blue or yellow. After post-treatment with the microwave irradiation, it is observed that the surface morphology of the phosphors has been modified from sheet-like shape to spherical shape, but their crystalline phase remains unchanged. The PL property measurement shows that the luminescent efficiency of the phosphors can be improved by 1.5 times under the microwave irradiation treatment conditions. These results reveal that such a simple process provides a promising option for mass production of the phosphors with high luminescent efficiency to apply to the next generation of the plane light source.

Although the present invention has been explained in relation to its preferred embodiments, it is to be understood that other modifications and variation can be made without departing the spirit and scope of the invention as hereafter claimed.

What is claimed is:

1. A method for manufacturing a plane light source, the method comprising:
    providing a first transparent substrate;
    forming a plurality of electrode pairs on said first transparent substrate;
    forming a dielectric layer on said first transparent substrate and covering said plurality of electrode pairs;
    coating a plurality of phosphors on said first transparent substrate and heating said plurality of phosphors by microwave irradiation after an MgO layer is coated on surface of each of said plurality of phosphors, wherein coating said MgO layer on surface of each of said plurality of phosphors comprises:
        mixing a $Mg(CH_3COO)_2 \cdot 4H_2O$ source, a di-ethylene glycol source and a
    NaOH source to produce first aqueous solution, and heating said first aqueous solution to 140° C. temperature for 1 hour;
        heating said first aqueous solution to 180° C. temperature for 2 hours;
        cooling said first aqueous solution to room temperature and mixing an ethanol source to produce second aqueous solution;
        mixing a phosphor source and deionized water to produce third aqueous solution;
        mixing said second aqueous solution with said third aqueous solution to produce fourth aqueous solution; and
        filtering and heating said fourth aqueous solution to 350° C. for 30 minutes to produce said plurality of phosphors coated with said MgO layer;
    providing a second transparent substrate;
    assembling said second transparent substrate with said first transparent substrate; and
    fulfilling an inert gas within said second transparent substrate and said first transparent substrate.

2. The method according to claim 1, further including forming a plurality of spacers between said first transparent substrate and said second transparent substrate.

3. The method according to claim 1, wherein said second transparent substrate has a phosphor layer coated on a inner plane and said phosphor layer is heated by microwave irradiation.

4. The method according to claim 1, wherein said coating said plurality of phosphors on said first transparent substrate is implemented by screen-printing or spraying.

5. The method according to claim 1, wherein said heating said plurality of phosphors by microwave irradiation uses a microwave with the power from 100 watts to 600 watts during an time interval.

6. The method according to claim 5, wherein said time interval is from 30 to 420 seconds.

7. The method according to claim 1, wherein said plurality of phosphors are white-light phosphors.

8. The method according to claim 1, wherein said plurality of phosphors are color-light phosphors.

9. The method according to claim 8 wherein said plurality of phosphors are blue-light phosphors.

10. The method according to claim 8, wherein said plurality of phosphors are green-light phosphors.

11. The method according to claim 8, wherein said plurality of phosphors are red-light phosphors.

12. A method for manufacturing a plane light source, the method comprising:
    providing a first transparent substrate having a plurality of electrode pairs formed thereon and a dielectric layer formed thereon to cover the plurality of electrode pairs;
    providing a plurality of phosphor particles, wherein the surface of each of the plurality of phosphor particles is individually and directly coated with an MgO wherein coating the MgO layer on surface of each of the plurality of phosphor particles comprises:
        mixing a $Mg(CH_3COO)_2 \cdot 4H_2O$ source, a di-ethylene glycol source and a NaOH source to produce first aqueous solution, and heating the first aqueous solution to 140° C. temperature for 1 hour;
        heating the first aqueous solution to 180° C. temperature for 2 hours;
        cooling the first aqueous solution to room temperature and mixing an ethanol source to produce second aqueous solution;
        mixing a phosphor source and deionized water to produce third aqueous solution;
        mixing the second aqueous solution with the third aqueous solution to produce fourth aqueous solution; and
        filtering and heating the fourth aqueous solution to 350° C. for 30 minutes to produce the plurality of phosphor particles coated with the MgO layer;
    coating the plurality of phosphor particles on the first transparent substrate to form a phosphor layer;
    providing a second transparent substrate;
    assembling the second transparent substrate with the first transparent substrate; and
    fulfilling an inert gas within the second transparent substrate and the first transparent substrate.

13. The method according to claim 12, wherein the plurality of phosphor particles are heated by microwave irradiation after the plurality of phosphor particles are coated on the first transparent substrate.

* * * * *